US 6,553,074 B1

(12) United States Patent
Shalvi et al.

(10) Patent No.: US 6,553,074 B1
(45) Date of Patent: Apr. 22, 2003

(54) METHOD AND DEVICE FOR COMBATING PCM LINE IMPAIRMENTS

(75) Inventors: Ofir Shalvi, Herzlia (IL); Zvi Reznic, Tel-Aviv (IL); Etai Zaltsman, Ramat-Hasharon (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/271,818

(22) Filed: Mar. 18, 1999

Related U.S. Application Data

(60) Provisional application No. 60/078,372, filed on Mar. 18, 1998.

(51) Int. Cl.[7] ............................ H04B 14/04; H04B 1/38; H04J 3/12
(52) U.S. Cl. ...................... 375/242; 375/222; 370/523
(58) Field of Search ............................... 375/242, 222; 370/523; 379/1, 6, 12, 88.07, 353

(56) References Cited

U.S. PATENT DOCUMENTS 6,002,713 A * 12/1999 Goldstein et al. ........... 375/222
6,118,813 A * 9/2000 Lai ............................. 375/231
6,212,207 B1 * 4/2001 Nicholas ...................... 370/523

* cited by examiner

*Primary Examiner*—Chi Pham
*Assistant Examiner*—Khai Tran
(74) *Attorney, Agent, or Firm*—Dana L. Burton; W. James Brady; Frederick J. Telecky, Jr.

(57) ABSTRACT

A method and device for combating logarithmic quantization and Robbed Bit Signaling (RBS) impairments that..are typical to PCM telephone lines is descried. An apparatus is described which includes a front-end unit which receives samples of the digital PCM line, an impairment identifier unit which identifies samples that have a high likelihood to have, large impairments due to the PCM line, an impairment estimator unit which estimates the value of impairment caused by the digital line, a samples reconstructor unit which fixes received samples by subtracting from them the value of the estimated impairment and an output unit transfers the reconstructed samples to a receiver. The method allows improving signal quality at the output of the PCM line, and thus improving data rates and robustness of digital communication receivers, and particularly of V.34 receivers, or V.90 transceivers that are digitally linked to the PCM, line.

23 Claims, 6 Drawing Sheets

METHOD AND DEVICE FOR COMBATING PCM LINE IMPAIRMENTS

RELATED APPLICATION

This application claims the benefit of U.S. Provisional Application No. 60/078,372, filed Mar. 18, 1998, entitled Method and Device for Combating PCM Line Impairments, which is incorporated by reference.

TECHNICAL FIELD OF THE INVENTION

The present invention relates generally to telecommunication methods and devices and in particular to PCM communications over telephone lines and the like.

BACKGROUND OF THE INVENTION

The vast majority of Public System Telephone Network (PSTN) lines communicate information digitally using Pulse Code Modulation (PCM) as the main telecommunication protocol. PCM is the sampling of the analog signal (most typically voice signals) to produce pulse amplitude modulated signals in which the amplitude of each of the pulses is directly proportional to the original analog signal at the instant of the sample. Each of these amplitude samples is then quantized by measuring the amplitude and comparing the measured value against a scale of amplitude values in which each number in the scale represents an amplitude. The most widely used scale is from 0 to 255 in which each value in the scale is represented by an 8-bit code. Each amplitude sample is then transmitted as a binary coded signal representing the original amplitude of the signal at the sampling instant in time. These binary codes are then transmitted digitally over the telephone line and are decoded at the receiving end to reconstruct the original analog signal. Even if the sampling rate of the analog signal is more than twice the frequency of the analog signal, the reconstructed analog signal is not the exact duplicate of the original analog signal due to the quantization. In other words, if an analog amplitude falls between two values in the quantization scale, one of the values is chosen as the closest match. On the decoding end of the transmission, the exact amplitude value chosen on the amplitude scale is used for reconstructing the analog signal. The difference between the original amplitude and the reconstructed amplitude is called quantization error or quantization noise. There are two different PCM encoding and decoding protocols used in the world: $\mu$-law (mu-law) coding (used the United States of America and other places) and A-law (used in Europe, Israel and other places). These two coding laws assign different quantization values for an analog signals. The two systems often have different quantization errors.

Modem communications over telephone lines have used a modulated analog signal which is modulated to encode digital data for digital communications between computers. The modulated analog signal of the modem is treated as any other analog signal by the PCM encoders and decoders. This form of modem communication was limited in speed due to the limited bandwidth allocated to voice telephone lines and due to quantization error or noise.

Recently, an improvement in the speed of modem communication has come in the form of PCM modems also known as 56K modems. These modems use the telephone line as a digital line. The International Telecommunications Union (ITU) recently issued a new recommendation for these modems designated Recommendation V.90. V.90 modems are designed for connections which are digital at one end and have only one digital-to-analog conversion in the path. That is, an information provider such as an Internet Service Provider (ISP) connects a digital modem directly to a PCM line at the telephone company while a user (such as in a home) connects a V.90 modem to an analog telephone line. Between the user and the telephone company, only a single analog to digital conversion is made.

From a V.90 modem user's prospective, downstream (from the Telephone Company Central Office to the user) speeds of up to 56,000 bits per second (bit/s) are possible, depending on telephone line conditions, with upstream (from the user to the information provider) speeds of up to 33,600 bit/s. The modems that conform to the ITU V.90 protocol use ITU V.34 protocol on the upstream. The downstream transmission is done by PCM (Pulse Coded Modulation) such that downstream quantization noise is eliminated. However, downstream data transmission is impaired by other factors such as distortions and non-linearity in the telephone line, length of the line and equipment at the telephone company. Recently, great progress has been made in the development of methods for combating noise when transmitting in the downstream direction.

Problems of noise on the upstream pose a different set of problems. Quantization noise is now present due to the analog to digital conversion on the upstream. Also, non-linearity in the telephone line, length of the line, analog noise and equipment at the telephone company introduce noise into the upstream. In addition, the telephone companies themselves intro noise through Robbed Bit Signaling (RBS). RBS is a technique used by the telephone companies on T1 lines that use digital transmission. The technique uses the least significant bit of the PCM code word to control telephone signaling functions such a dial tone, ring, busy, answer, etc. This signaling method negatively effects V.90 by reducing the data rate on the v.34 connections on the upstream.

Thus, most upstream noise can be classified as one of two factors, generally described as PCM noise. The first factor is logarithmic quantization noise such as either $\mu$-law or A-law quantization in which the quantization interval grows with the magnitude of the signal. The second factor is Robbed Bit Signaling (RBS) in which the least-significant bit of some of the samples may be overridden by control information that is transferred over the telephone network.

There are several methods proposed to combat the V.90 upstream or V.34 impairments. For example, the V.34 standard includes an option for using a non-uniform constellation that has a higher spacing around its high magnitude symbols, which are likely to suffer from PCM impairments more than the low magnitude symbols. Another class of approaches advocates error correction codes that are robust to a PCM noise, such as the 64 states trellis code proposed in the V.34 standard. However, practical experience shows that the effectiveness of these methods is limited. Thus, there is a need in the telecommunications art for combating PCM noise and improving data rate on the upstream of V.90 connections.

SUMMARY OF THE INVENTION

The present invention solves the above-mentioned problems in the art and other problems which will be understood by those skilled in the art upon reading and understanding the present specification. The present invention provides a method and device for combating logarithmic quantization and Robbed Bit Signaling (RBS) impairments that are typical to Pulse Code Modulation (PCM) telephone lines.

An apparatus is described which includes a front-end unit which receives samples of the digital PCM line, an impairment identifier unit which identifies samples that have a high likelihood to have large impairments due to the PCM line, an impairment estimator unit which estimates the value of impairment caused by the digital line, a samples reconstructor unit which fixes received samples by subtracting from them the value of the estimated impairment and an output unit which transfers the reconstructed samples to a receiver.

The present invention is particularly useful as a front end to a digital communications receiver that receives samples of the digital PCM lines. For example, but not by limitation, the present invention is useful as a front end to either V.34 receiver or V.90 receiver which are digitally linked to a T1 line. The present invention is further applicable to any receiver that receives PCM data from a digital communication line.

The present invention includes a method for combating PCM line impairments. The present invention allows improving signal quality at the output of the PCM line, and thus improving data rates and robustness of digital communication receivers, and particularly of V.34 receivers, that are digitally linked to the PCM line. This method can be implemented in a manner that requires small computational resources and can be added on top of all the methods described above for combating PCM impairments.

BRIEF DESCRIPTION OF THE DRAWINGS

In the drawings, where like numerals refer to like components throughout the several views.

DETAILED DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that structural, logical and electrical changes may be made without departing from the scope of the present inventions. The following detailed description is, therefore, not to be taken in a limiting sense, and the scope of the present inventions is defined only by the appended claims.

Figure 1:
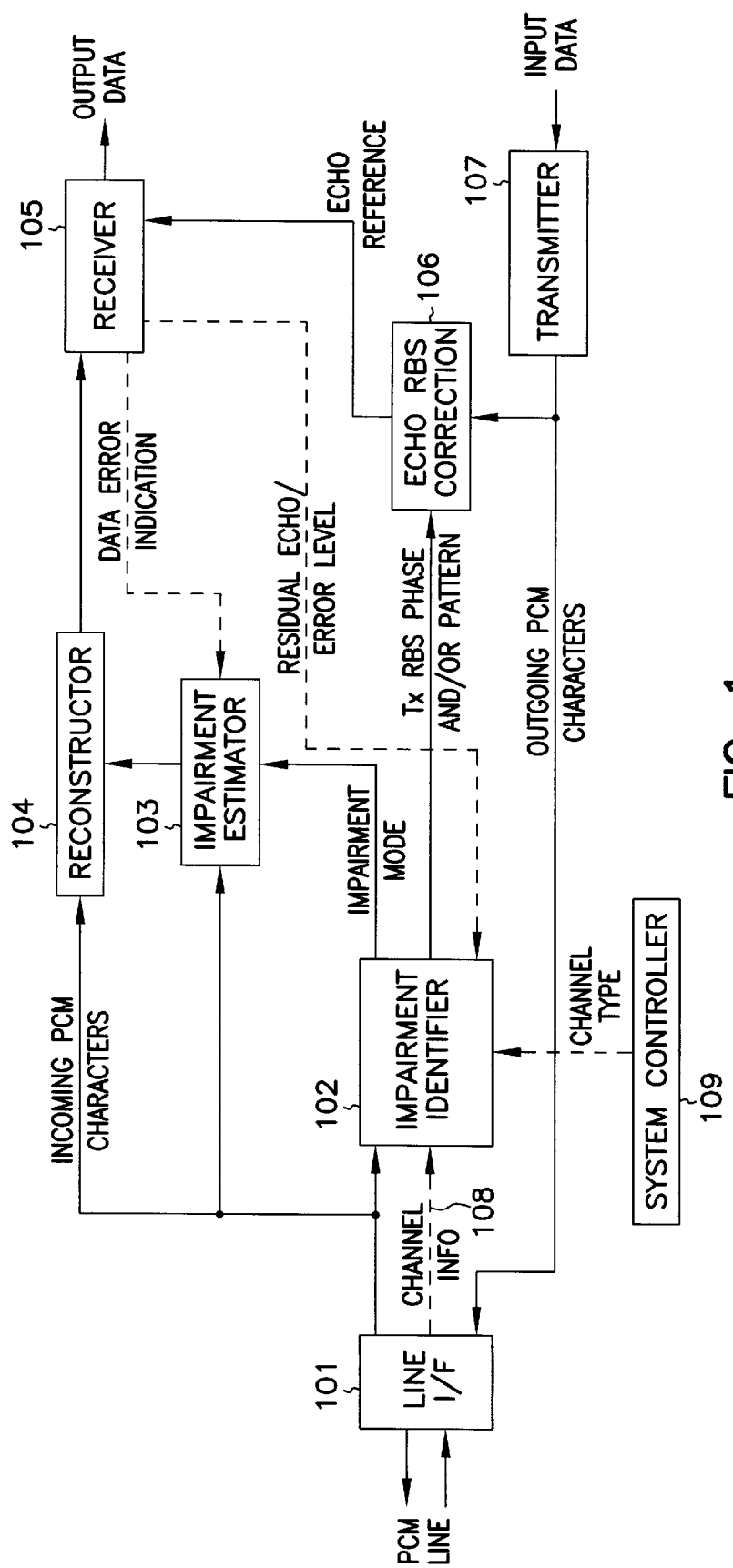
FIG. 1 depicts the structure of digital modem using the disclosed invention.

FIG. 1 is a block diagram which describes a digital modem (modulator and demodulator) interface of the present invention. This modem interface would typically be connected directly to a digital telephone line to provide an interface for an Internet Service Provider (ISP) or some other information provider. This modem interface would typically be located in the telephone company's central office or at an ISP location which is connected to a telephone company central office by a PCM line.

In FIG. 1, the line interface (I/F) unit 101 connects the modem to a digital PCM line, such as T1, ISDN, or E1 line, and outputs to unit 102 an 8 kHz stream of PCM characters which are logarithmically quantized (by $\mu$-law or A-law quantization) on the upstream. The least significant bit of some of this upstream data may be corrupted by Robbed Bit Signaling (RBS). The line interface unit 101 also receives 8 kHz PCM characters from the transmitter unit 107 and sends it over the digital line for the downstream path to a user. The line interface unit may send channel information 108 to unit 102 to extract information such as the type of line (for example, but not by way of limitation, T1, E1, ISDN, etc.), the amount and timing of data samples which are corrupted by robbed bit signaling (RBS), and the values of the bits that are planted on the least significant bits of the transmitted PCM characters using RBS.

The Impairment Identifier unit 102 identifies the timing of data samples where robbed bit signaling (RBS) occurs both for the incoming data, and for the outgoing data whose line echo may be added to the incoming data. Unit 102 synchronizes unit 103 to the timing of the RBS in the incoming data, and synchronizes unit 106 to the timing of the RBS in the outgoing data. The timing phases of the incoming and the outgoing RBS can be identified by providing different timing phases of the RBS patterns to unit 103 and 106, respectively, and choosing the phases which correspond to lowest cumulative error magnitude at the output of the equalizer and the echo canceler, respectively, at the receiver unit 105.

The Impairment Estimator unit 103 generates an estimate of the RBS impairment. When unit 102 identifies that the PCM character is corrupted by RBS, the RBS impairment is estimated as half of the difference between the levels of the received PCM and the adjacent PCM character which differs from the received character only by its least significant bit. When unit 102 identifies that the PCM character is not corrupted by RBS, the RBS impairment is estimated by zero. In that manner, the peak error and the mean square error due to RBS are reduced significantly. The probability density function of a PCM quantization error in the presence of RBS is:

$$f_e(e) = \begin{cases} 1/4\Delta, & \Delta/2 < |e| \le 3\Delta/2 \\ 1/2\Delta, & |e| \le \Delta/2 \\ 0, & |e| > 3\Delta/2 \end{cases} \quad (1)$$

where $\Delta$ is the quantizer step at the magnitude of the quantizer input. The power of the error is $7\Delta^2/12$ and its peak value is $3\Delta/2$. The probability density function error after applying in the present invention in the mode where unit 103 estimates the RBS impairment as half of the difference between the levels of the received PCM and the adjacent PCM character which differs from the received character only by its least significant bit is:

$$f_e(e) = \begin{cases} 1/2\Delta, & |e| \le \Delta \\ 0, & |e| > \Delta \end{cases} \quad (2)$$

The power of the error at the input to the receiver unit 105 is $\Delta^2/3$ and -its peak value is $\Delta$. Therefore, the present invention is capable of reducing the peak of the error by a factor of 3/2 (3.53 dB), and reduced the error power by a factor of 7/4 (2.42 dB).

Figure 6:
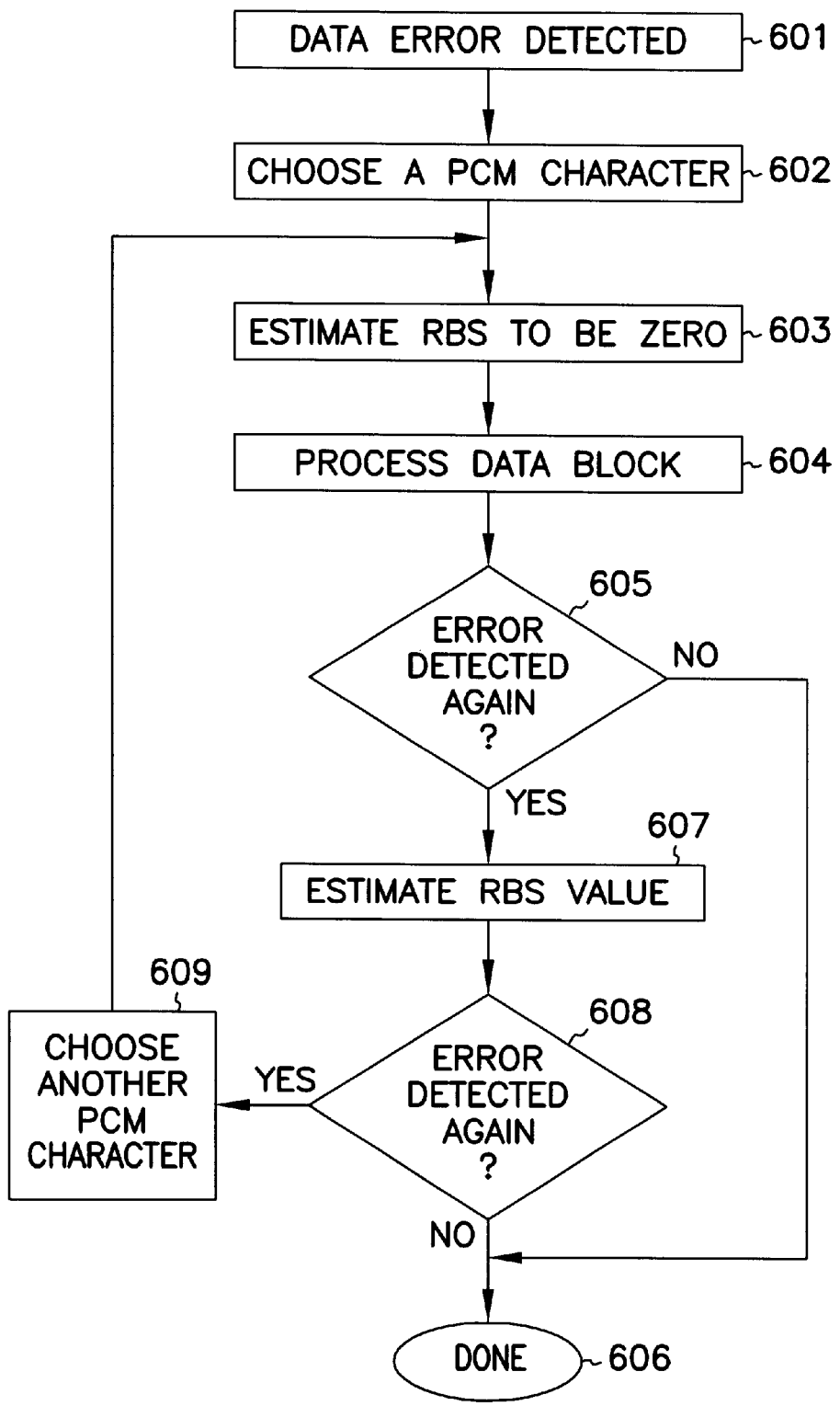
FIG. 6 describes a correction algorithm of the impairment estimator of FIG. 1.

In operation, impairment estimator unit 103 of FIG. 1 may receive an error indication from the receiver unit 105, and as a result it may apply a correction algorithm shown in FIG. 6. When an error detection is made at 601, the correction algorithm of the impairment estimator chooses a PCM character which was corrupted by RBS at 602. This character is drawn from a PCM segment that has a large quantization interval which was received near the time of the detection of the error by the receiver. The algorithm then estimates the RBS impairment by zero at 603. The algorithm then initiates re-processing of the data block where the error has occurred at 604. If the receiver detects an error in the data block again at 605, then the algorithm estimates the RBS impairment at 607 as being the difference between the levels of the received PCM character and the adjacent PCM character which differs from the received character only by its least significant bit. The algorithm then initiates reprocessing of the data block where the error has occurred. If an error occurred again at 608, then unit 103 will choose another PCM character from the block of characters and repeat the process by returning to 603. Impairment estimator unit 103 may apply a more elaborate algorithm such as the one depicted in FIG. 3 and explained below.

The signal re-constructor unit 104 reconstructs the incoming signal by adding the estimated RBS impairment to the level of the received PCM characters, and outputs the result to the receiver unit 105. Unit 105 is a known digital receiver such as a V.34 receiver, which is capable of re-processing a data block. Unit 105 identifies and indicates decoding errors by for example and not by limitation, examining the path consistency of a Viterbi detector algorithm in the receiver. Receiver 105 may use an IF echo-canceler and may provide an indication of cumulative residual echo magnitude at the output of the echo-canceler filter. It also provides an indication of the cumulative residual noise magnitude at the incoming signal.

The Echo RBS Correction unit 106 receives from unit 102 an indication on the timing of the outgoing characters that are corrupted by RBS, and estimates the RBS corrupted outgoing character. One algorithmic approach is to calculate the median between the levels of the received PCM character and the adjacent PCM character which differs from the received character only by its least significant bit. In cases where the control bits that are transferred between the telephone company central offices using RBS have a periodic pattern, the unit 106 will generate a PCM character whose 7 most significant bits are equal to the 7 most significant bits of the transmitted character and its least significant bit is equal to the value of the control bit which is estimated according to the known periodical pattern, where the phase of the pattern is estimated by,unit 102. For example, in some T1 systems, the pattern has a period of 24 bits. In this manner, the effect of robbed bit signaling on the performance of line echo can be significantly improved.

Transmitter 107 is a known digital transmitter. A system controller 109 sends the impairment identifier unit 102 information on the type of the digital channel such as T1, E1 or ISDN lines. This channel type is used by unit 102 to choose the algorithm for identifying the line's impairments.

Figure 2:
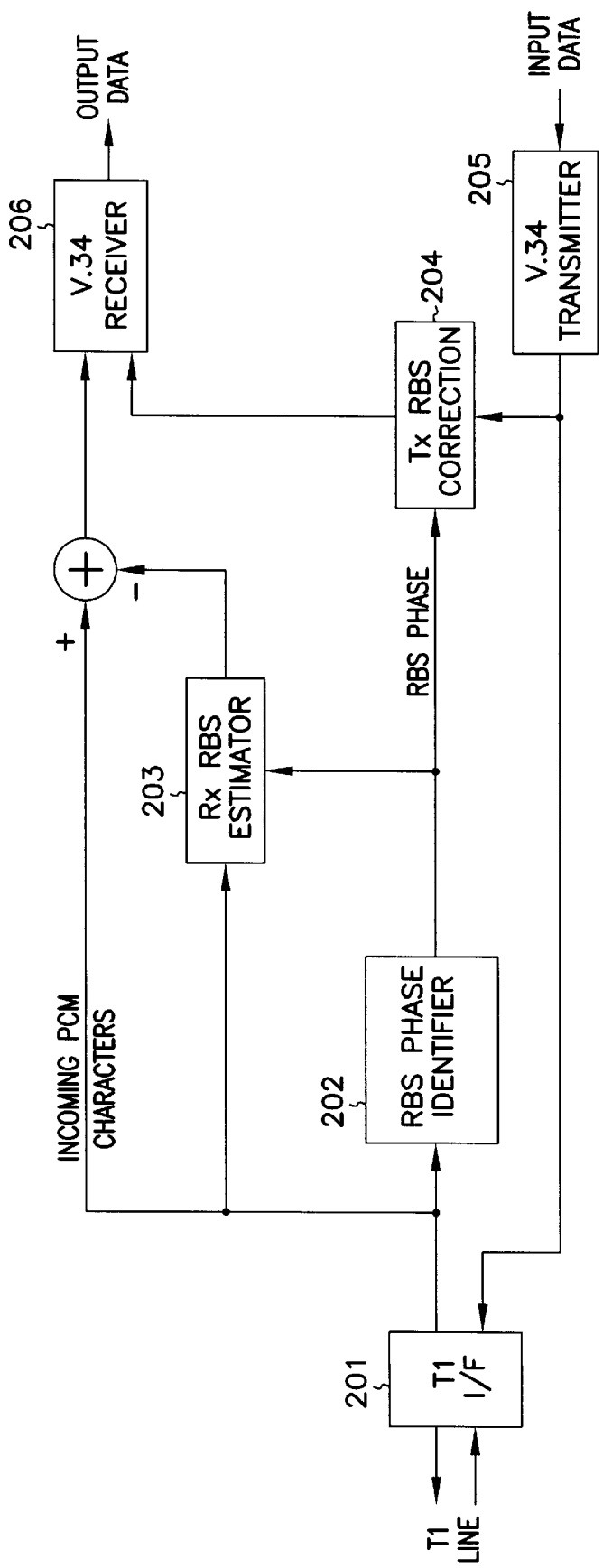
FIG. 2 depicts the structure of digital V.34 modem connected to a T1 digital line using the disclosed invention.

FIG. 2 depicts the structure of digital V.34 modem connected to a T1 digital line using the disclosed invention. FIG. 2 is another embodiment of the invention described in conjunction with FIG. 1. Unit 201 sends and receives 8 kHz streams of PCM characters over a T1 or other digital line. Unit 202 identifies PCM characters which are infected by RBS. In many cases these characters occur every sixth character. Receive RBS Estimator 203 estimates the error due to RBS using the methods described above and below in conjunction with FIG. 3. Transmit RBS corrector unit 204 compensates for RBS error in the transmitted signal. V.34 transmitter 205 and V.34 receiver 206 are known devices.

Figure 3:
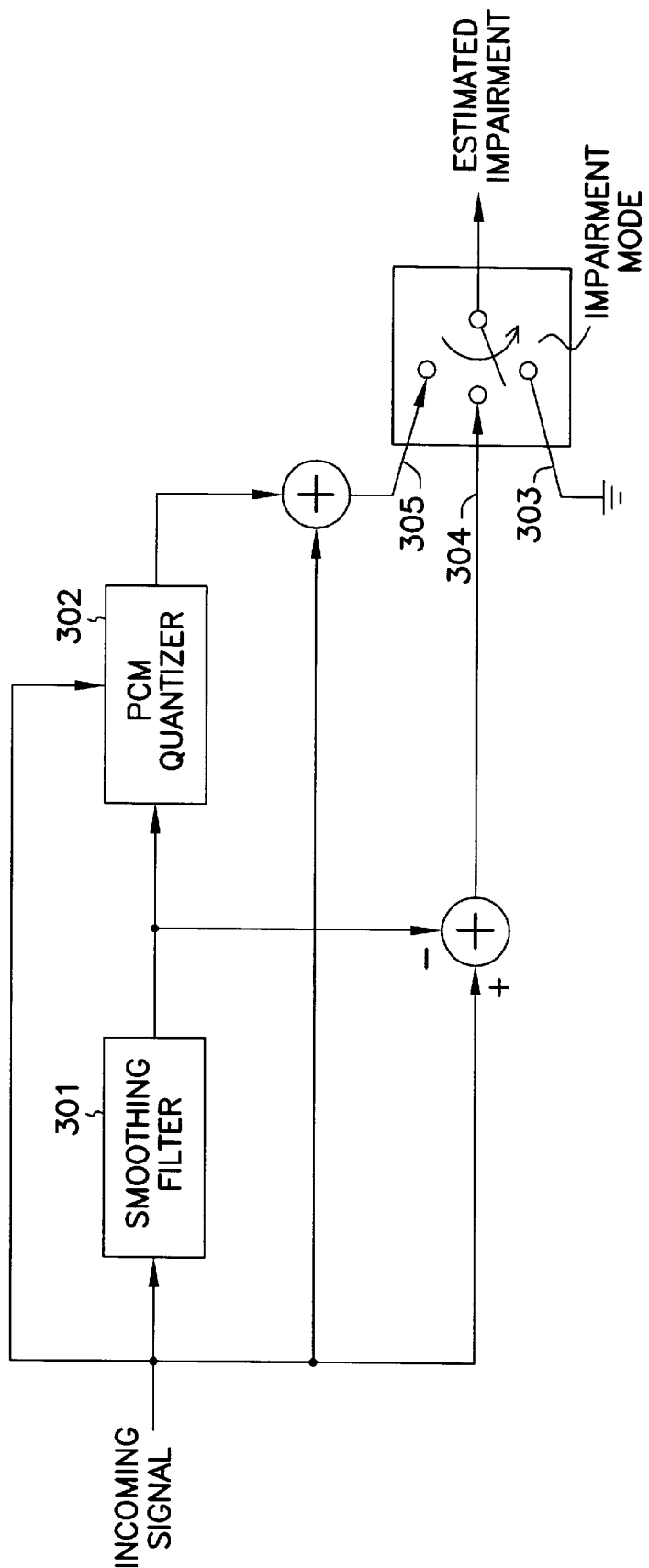
FIG. 3 depicts an impairment estimation algorithm used within the present invention.

FIG. 3 depicts an impairment-estimation algorithm used within the unit 103 or 203. The estimated impairment value is selected by the impairment mode (output of unit 102) and it can be one of three values. First, the value can be estimated as zero 303 in the simplest case. Second, the estimated impairment value 304 can be estimated as the difference between the level of the received PCM character and the output of smoothing filter unit 301. The smoothing filter 301 performs a weighted linear combination which estimates the signal before the PCM impairment, and gives low weights to PCM characters which were impaired by RBS and/or had high magnitude. Third, the estimated impairment value 305 is the difference between the level of the received PCM character and the level of a PCM character which is generated by unit 302. Unit 302 performs PCM quantization of the output of unit 301, and its output level is restricted to be the level of the PCM character which is equal to the received PCM character by its seven most significant bits.

The first type of output (zero) 303 output will typically be chosen in case there is no RBS in the PCM character and the character has low magnitude. The second type of output 304 will typically be chosen in case of a PCM character which either has a high magnitude or suffers from RBS. The third type of output 305 will typically be chosen in case of a PCM character which suffers from RBS.

In the situation where the operation of RBS by the telephone company results in flipping (changing) the least significant bit of a PCM character and the output of unit 302 recovers the original PCM character prior to flipping its least significant bit, then the PCM quantization error is uniformly distributed in the range $-\Delta/2$ where $\Delta$ is defined above after equation (1). In reviewing equation (1) above, one skilled in the art will observe that in such a case described here, the peak of the quantization error is reduced by a factor of 3 (which is 9.54 db) and its power is reduced by a factor of 7 (which is 8.45 dB).

Figure 4:
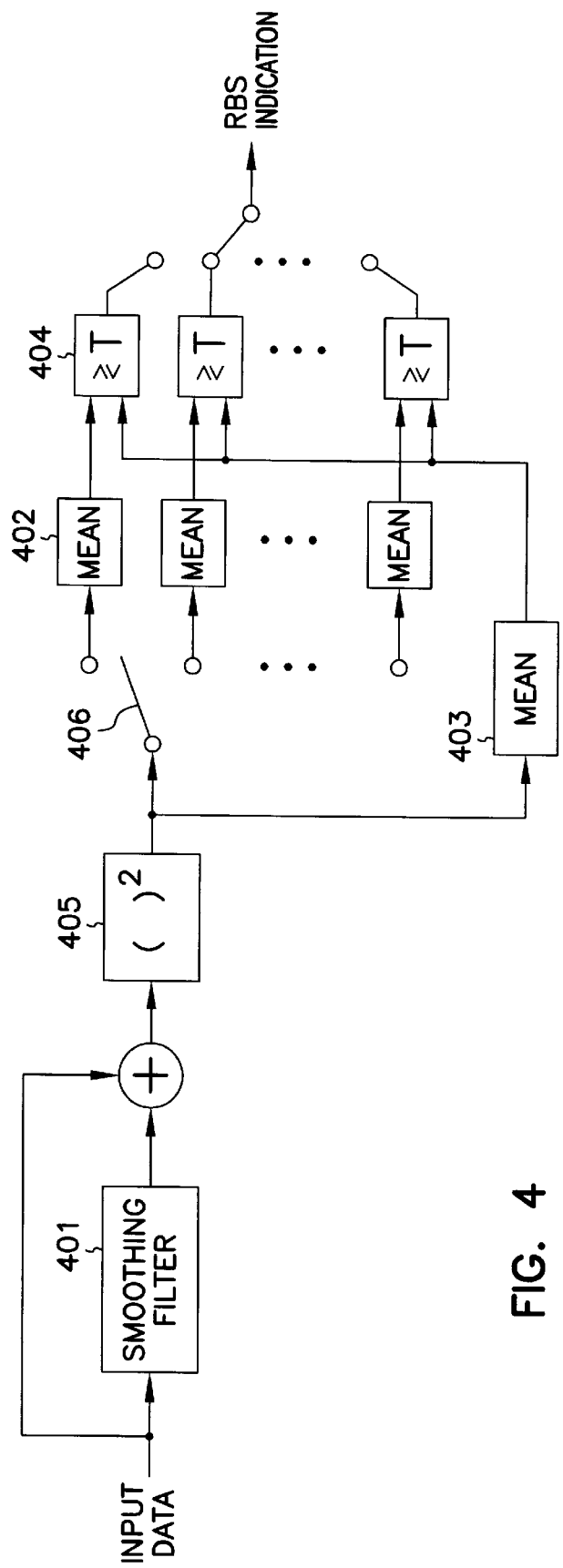
FIG. 4 depicts an impairment identification algorithm used within the present invention.

FIG. 4 shows an algorithm for identifying the phases of RBS which may be applied in unit 102. The incoming signal is subtracted from an output of a smoothing filter 401, which is designed to reduce the effect of RBS and which performs a weighted linear combination which estimates the signal before the PCM impairment, and gives low weight to current PCM character. The bandwidth and pass-bands of the filter 401 are matched to the spectrum of the received signal. Particularly, in case the incoming signal is sine wave or a combination of a few sine waves, then the smoother will be a narrow band-pass filter which is passing only the frequencies around the frequencies of the transmitted sine waves. The power of the difference signal 405 is averaged by unit 403. The power of the signal 405 is also averaged by units 402 each of which accumulate separately the power averaged over N sub-sequences which are obtained from sequence 406 by decimation at ratio of N in N different phases, where N is the expected period of the RBS pattern. The existence and the phase of the RBS bits are identified by examining the ratio between values of N accumulators of units 402 to the accumulator of unit 403, wherein a high ratio implies the existence of RBS at the corresponding phase. The phase and pattern of the RBS may be identified reliably during periods in which sine waves are transmitted, for example phase 2 of the training sequence according to the ITU V.34 standard, and filter 401 can have a very low bandwidth.

Figure 5:
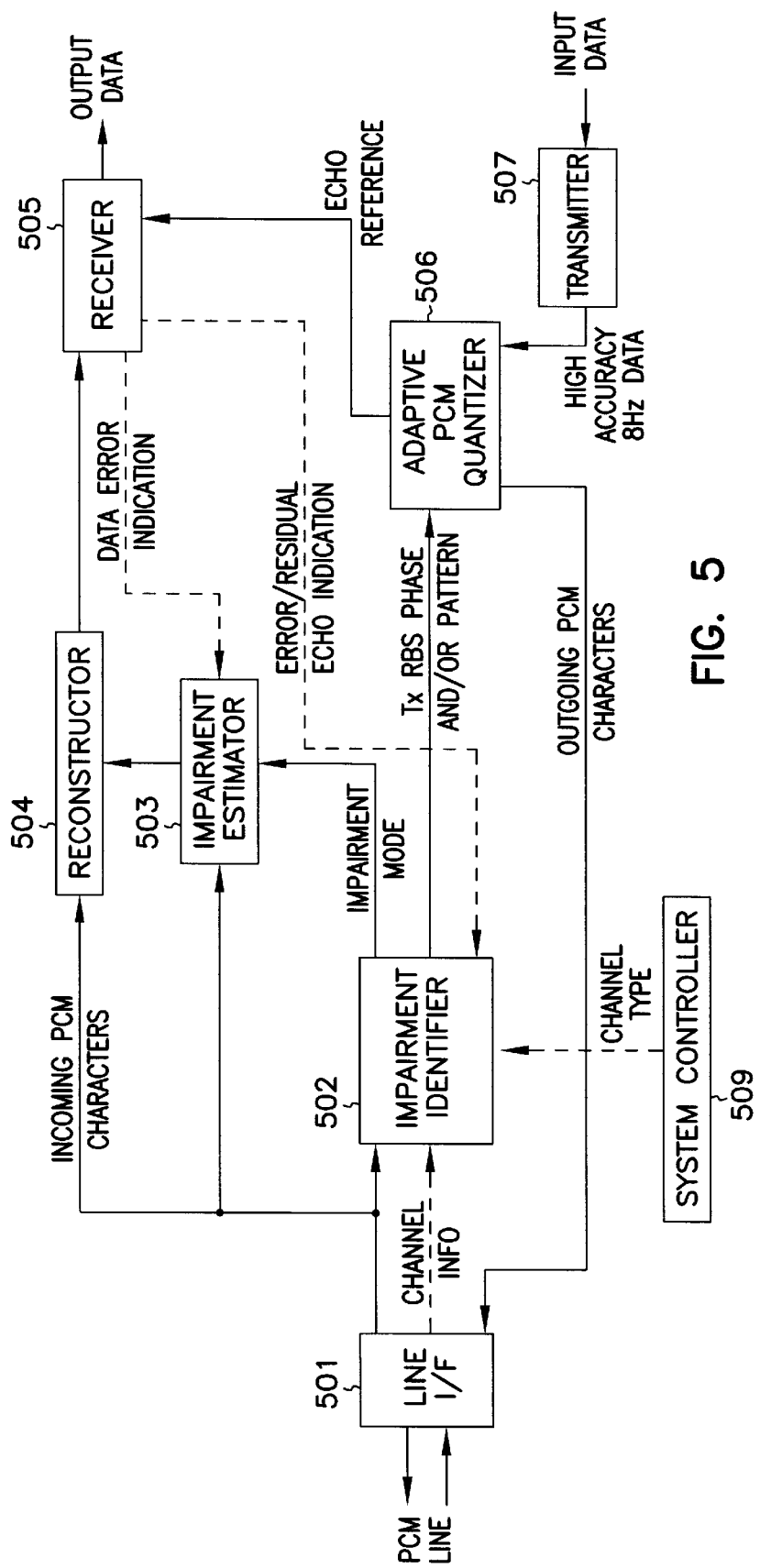
FIG. 5 depicts the structure of a digital modem using the disclosed invention which compensates for RBS in both the incoming signal and the outgoing signal.

FIG. 5 depicts the structure of a digital modem using the disclosed invention which compensates for RBS in both the incoming signal and the outgoing signal, in PCM lines where the RBS pattern can be predicted. Units 501, 503, 504, 505, and 509 are similar to units 101, 103, 104, 105 and 109 respectively, which were described above. Unit 502 is similar to unit 102, and it is particularly capable of identifying the pattern and the phase of the robbed bits that are added over the least significant bits of the outgoing PCM characters. Unit 507 is a known digital, transmitter that outputs a 8 kHz samples signal with low level of quantization error, for example, in 16-bit linear quantization.

Unit 506 is an adaptive PCM quantizer which operates in the following manner. If impairment identifier unit 502 identifies that the PCM character does not suffer from RBS, adaptive PCM quantizer unit 506 quantizes its input to a quantization grid that includes all 256 PCM levels. If impairment identifier unit 502 identifies that the PCM character will suffer from RBS and that the value of the least significant bit (the robbed bit) is zero, then unit 506 quantizes its input to a quantization grid that includes the levels of the 128 PCM characters whose least significant bit is zero. If impairment identifier unit 502 identifies that the PCM character suffers from RBS and that the value of the least significant bit (the robbed bit) is one, then unit 506 quantizes its input to a quantization grid that includes the levels of the 128 PCM characters whose least significant bit is one. In this manner, the effect of robbed bit signaling on the transmitted data can be significantly reduced, and the data rate of the transmitted data can be increased without increasing the error rate of the receiver which is connected to the other side of the line. The probability density function of the error in the transmitted signal due to the PCM quantization and RBS is given by equation (1) above. The probability density function of the error in the transmitted signal due to the PCM quantization and RBS when the disclosed invention is applied and when unit 506 receives the correct RBS pattern from unit 502 is given by equation (2) above. The power of the error and the peak of the error are reduced by the present invention by factors of 7/4 (2.42 dB) and 3/2 (3.53 dB).

CONCLUSION

Although specific embodiments have been illustrated and described herein, it will be appreciated by those of ordinary skill in the art that any arrangement which is calculated to achieve the same purpose may be substituted for the specific embodiments shown. This patent is intended to cover any adaptations or variations of the present invention. Therefore, it is manifestly intended that this invention be limited only by the claims and the equivalents thereof.

What is claimed:

1. A device, comprising:
   a input interface;
   an impairment identifier connected to the input interface;
   an impairment estimator connected to the input interface and the impairment identifier;
   a sample reconstructor connected to the impairment estimator and the input interface; and
   an output connected to the sample reconstructor.

2. The device according to claim 1 wherein the input interface is adapted to receive Pulse Code Modulated (PCM) data from a digital communication line.

3. The device according to claim 1 wherein the impairment identifier identifies Robbed Bit Signaling (RBS) impairments on Pulse Code Modulated (PCM) data.

4. The device according to claim 1 wherein the impairment identifier identifies Pulse Code Modulated (PCM) data which is subject to large quantization error.

5. The device according to claim 1 wherein the impairment identifier identifies impairments based upon the magnitude of a Pulse Code Modulated (PCM) character.

6. The device according to claim 1 further including a smoothing filter which performs weighted linear combination of the levels of Pulse Code Modulated (PCM) characters.

7. The device according to claim 6 wherein the smoothing filter performs a weighted linear combination to estimate a signal value before a PCM impairment and which gives low weights to PCM data which was impaired by RBS or had a high magnitude.

8. The device according to claim 7 wherein the impairment identifier identifies highly impaired PCM characters by comparing the level represented by the incoming PCM characters to the output of the smoothing filter.

9. The device according to claim 8 further including a PCM quantizer connected to the smoothing filter for performing quantization of the output of the smoothing filter.

10. The device according to claim 6 wherein the smoothing filter performs a weighted linear combination to estimate a signal value before a PCM impairment and which gives low weights to the PCM data which was impaired by RBS or had a high magnitude.

11. The device according to claim 3 wherein the impairment identifier exploits the periodic appearance of RBS impairments.

12. The device according to claim 1 wherein the output of the sample reconstructor is a reconstructed Pulse Code Modulated (PCM) character which is a median of a first level represented by a first PCM character and a second level of a second PCM character whereby the first and second PCM characters have the same seven most significant bits.

13. The device according to claim 12 wherein an incoming PCM character and an estimate from the impairment estimator is restricted to be equal to the PCM character by at least some of a plurality of most significant bits of the incoming PCM character.

14. The device according to claim 1 further including an echo canceler filter which is modified to minimize errors due to Robbed Bit Signaling (RBS).

15. A method of correcting Pulse Code Modulated (PCM) character noise, comprising:
   receiving an indication of an error of a first PCM character;
   selecting a second PCM character received near the time of the first character;
   estimating an impairment value from the first and second PCM characters and;
   correcting the first PCM character using the impairment value.

16. The method according to claim 15, wherein selecting further includes selecting the second PCM character from a segment of PCM characters which have a large quantization interval.

17. The method according to claim 15, wherein selecting further including;
   selecting the second PCM character which differs from the first PCM character by the least significant bit; and
   estimating the impairment value as being the difference between levels of the first PCM character and the second PCM character.

18. The method according to claim 17, wherein selecting further including;
   selecting a third PCM character which differs from the first PCM character by the least significant bit; and estimating the impairment value as being the difference between levels of the first PCM character and the third PCM character.

19. A method of minimizing Pulse Code Modulated (PCM) line noise, comprising:

receiving samples of PCM data;

identifying samples of the PCM data that have a high likelihood to have large impairments;

estimating the value of impairment of the samples of the PCM data;

reconstructing the samples of the PCM data.

20. The method according to claim 19 further including converting the PCM data to analog data wherein the converting suffers from a non-uniform quantization noise or missing PCM codes.

21. A method of selecting an impairment value, comprising:

receiving a Pulse Code Modulated (PCM) character;

performing smoothing filtration of the PCM character before impairment and producing therefrom a weighted linear value;

calculating the difference between the level of the PCM character and the weighted linear value to produce therefrom an impairment value; and correcting the PCM character using the impairment value.

22. A method of selecting an impairment value for a Pulse Code Modulated (PCM) character suffering from Robbed Bit Signaling (RBS), comprising:

receiving a PCM character;

performing PCM quantization of the PCM character to produce therefrom a quantized value;

calculating the difference between the level of the PCM character and the quantized value to produce therefrom an impairment value; and correcting the PCM character using the impairment value.

23. An interface between an analog to digital convert and a digital processor, comprising:

a digital communication line interface;

an impairment identifier connected to the input interface;

an impairment estimator connected to the input interface and the impairment identifier;

a sample reconstructor connected to the impairment estimator and the input interface;

a digital to analog convertor connected to the sample reconstructor and the impairment estimator; and an analog output connected to the sample reconstructor.

* * * * *